US010857487B2

(12) United States Patent
Marshall et al.

(10) Patent No.: US 10,857,487 B2
(45) Date of Patent: Dec. 8, 2020

(54) SAND TRAPS FOR USE IN OIL AND GAS EXTRACTION OPERATIONS

(71) Applicant: IDEAL COMPLETION SERVICES LLC, Tulsa, OK (US)

(72) Inventors: Scott Marshall, Calgary (CA); Cody Steven Moore, Evanston, WY (US)

(73) Assignee: IDEAL COMPLETION SERVICES LLC, Tulsa, OK (US)

( * ) Notice: Subject to any disclaimer, the term of this patent is extended or adjusted under 35 U.S.C. 154(b) by 0 days.

(21) Appl. No.: 16/401,941

(22) Filed: May 2, 2019

(65) Prior Publication Data

US 2020/0346139 A1     Nov. 5, 2020

(51) Int. Cl.
*B01D 21/26* (2006.01)
*B01D 21/02* (2006.01)
*B01D 21/24* (2006.01)
*B01D 21/30* (2006.01)

(52) U.S. Cl.
CPC ........... *B01D 21/02* (2013.01); *B01D 21/245* (2013.01); *B01D 21/267* (2013.01); *B01D 21/302* (2013.01)

(58) Field of Classification Search
CPC .... B01D 21/02; B01D 21/245; B01D 21/267; B01D 21/302
See application file for complete search history.

(56) References Cited

U.S. PATENT DOCUMENTS

| 4,140,632 A * | 2/1979 | Boivin | B01D 21/267 |
| | | | 209/731 |
| 2009/0316518 A1* | 12/2009 | Goldsmith | B01F 5/0413 |
| | | | 366/134 |
| 2020/0116004 A1* | 4/2020 | Gamarra | E21B 43/35 |

FOREIGN PATENT DOCUMENTS

CN      201517055 U   *   6/2010

OTHER PUBLICATIONS

Yang et al—CN201517055U Machine Translation—2010 (Year: 2010).*
Whitelock, D. P. et al—"Using Cyclones Effectively at Cotton Gins"—2009 (Year: 2009).*

* cited by examiner

*Primary Examiner* — Bradley R Spies
(74) *Attorney, Agent, or Firm* — Avant Law Group, LLC

(57) ABSTRACT

A sand trap for use in oil and gas extraction operations includes a cylindrical vessel for receiving a high-pressure fluid stream with particulates. The vessel has a vertical longitudinal axis and a hollow cylindrical wall having upper and lower ends and an inlet opening generally perpendicular to but askew to the vessel longitudinal axis. Upper and lower caps extend from the upper and lower ends and have openings along the vessel longitudinal axis. An annular diverter has top and bottom ends and a longitudinal axis coaxial with the vessel longitudinal axis. A diverter outer wall permanently extends from an inner face of the cylindrical wall, and a diverter inner wall has an upper portion narrowing to a choke area and a lower portion flaring out from the choke area. A vent pipe extends from the upper cap opening to a location between the upper cap and the diverter top end.

25 Claims, 11 Drawing Sheets

SAND TRAPS FOR USE IN OIL AND GAS EXTRACTION OPERATIONS

FILED OF THE DISCLOSURE

The disclosure relates generally to the field of oil and gas extraction. More particularly, the disclosure relates to sand traps, also commonly referred to as sand separators, which are commonly used in oil and gas extraction for removing sand and particulates from fluid streams to prevent erosive damage to piping, valves, and pumping equipment.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, a sand trap for use in oil and gas extraction operations includes a cylindrical vessel for receiving a high pressure fluid stream with particulates. The cylindrical vessel has a longitudinal axis extending generally vertically and includes a hollow cylindrical wall with upper and lower ends, inner and outer faces, and an inlet opening. The inlet opening has an axis generally perpendicular to but askew to the longitudinal axis of the cylindrical vessel. An upper cap extends from the cylindrical wall upper end, and the upper cap has an opening along the longitudinal axis of the cylindrical vessel. A vent pipe has an upper end extending from the upper cap opening and a lower end between the upper cap and the cylindrical wall lower end. A lower cap extends from the cylindrical wall lower end, and the lower cap has an opening along the longitudinal axis of the cylindrical vessel. An annular diverter has a longitudinal axis coaxial with the longitudinal axis of the cylindrical vessel and includes an outer wall inwardly adjacent the inner face of the hollow cylindrical wall, an inner wall, a top end welded to the cylindrical wall inner face, and a bottom end welded to the cylindrical wall inner face. The inner wall has an upper portion that narrows to a choke area and a lower portion flaring out from the choke area toward the cylindrical wall lower end.

According to another embodiment, a sand trap for use in oil and gas extraction operations includes a cylindrical vessel for receiving a high pressure fluid stream with particulates. The cylindrical vessel has a longitudinal axis extending generally vertically and includes a hollow cylindrical wall having upper and lower ends, inner and outer faces, and an inlet opening. The inlet opening has an axis generally perpendicular to but askew to the longitudinal axis of the cylindrical vessel. An upper cap extends from the cylindrical wall upper end, and the upper cap has an opening along the longitudinal axis of the cylindrical vessel. A lower cap extends from the cylindrical wall lower end, and the lower cap has an opening along the longitudinal axis of the cylindrical vessel. An annular diverter has top and bottom ends and a longitudinal axis coaxial with the longitudinal axis of the cylindrical vessel and includes outer and inner walls. The diverter outer wall is inwardly adjacent and permanently extending from the inner face of the hollow cylindrical wall, and the diverter inner wall has an upper portion that narrows to a choke area and a lower portion flaring out from the choke area toward the cylindrical wall lower end. A vent pipe has an upper end extending from the upper cap opening and a lower end between the upper cap and the diverter top end.

DETAILED DESCRIPTION

Figure 1:
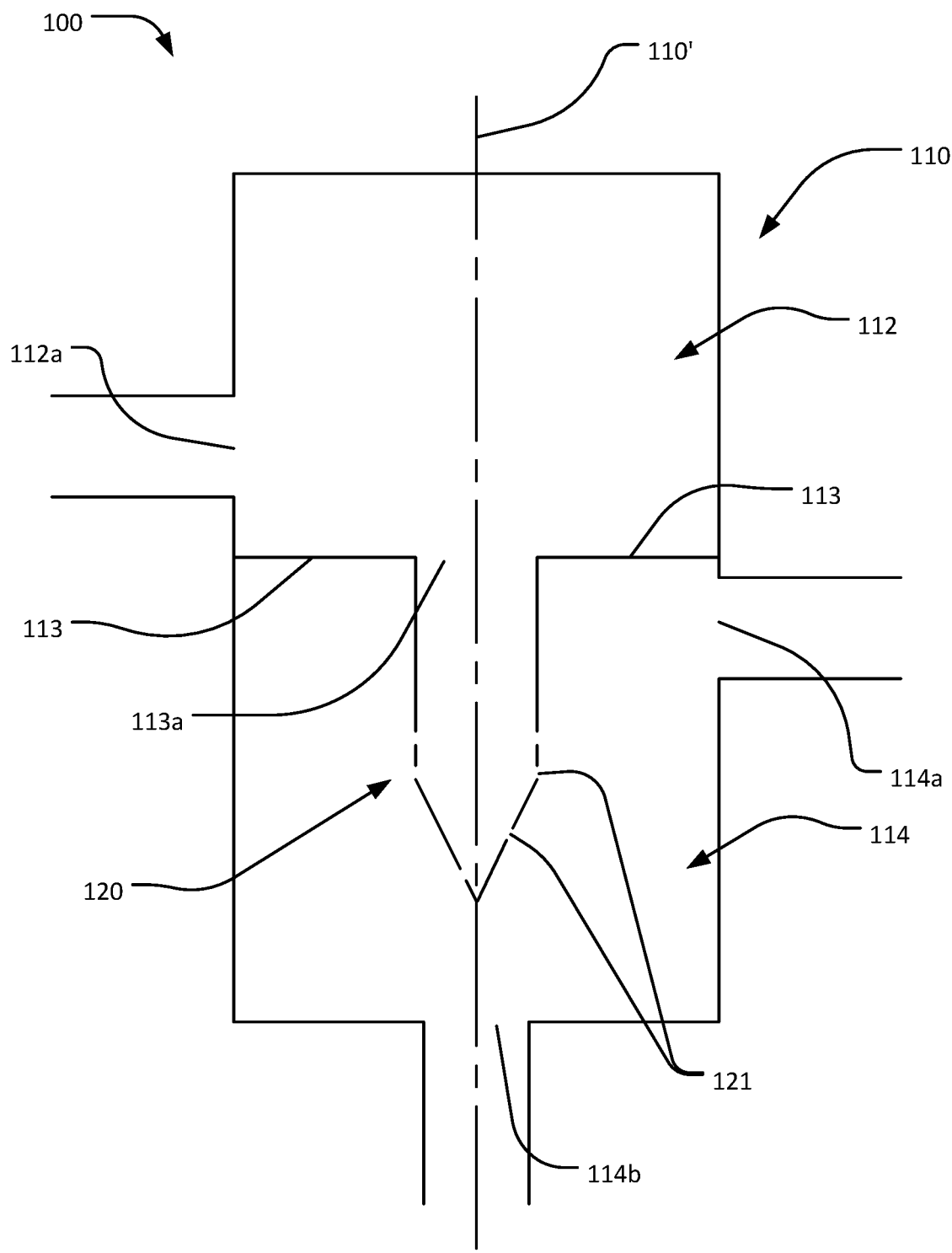
FIG. 1 illustrates a PRIOR ART sand trap.
Figure 2:
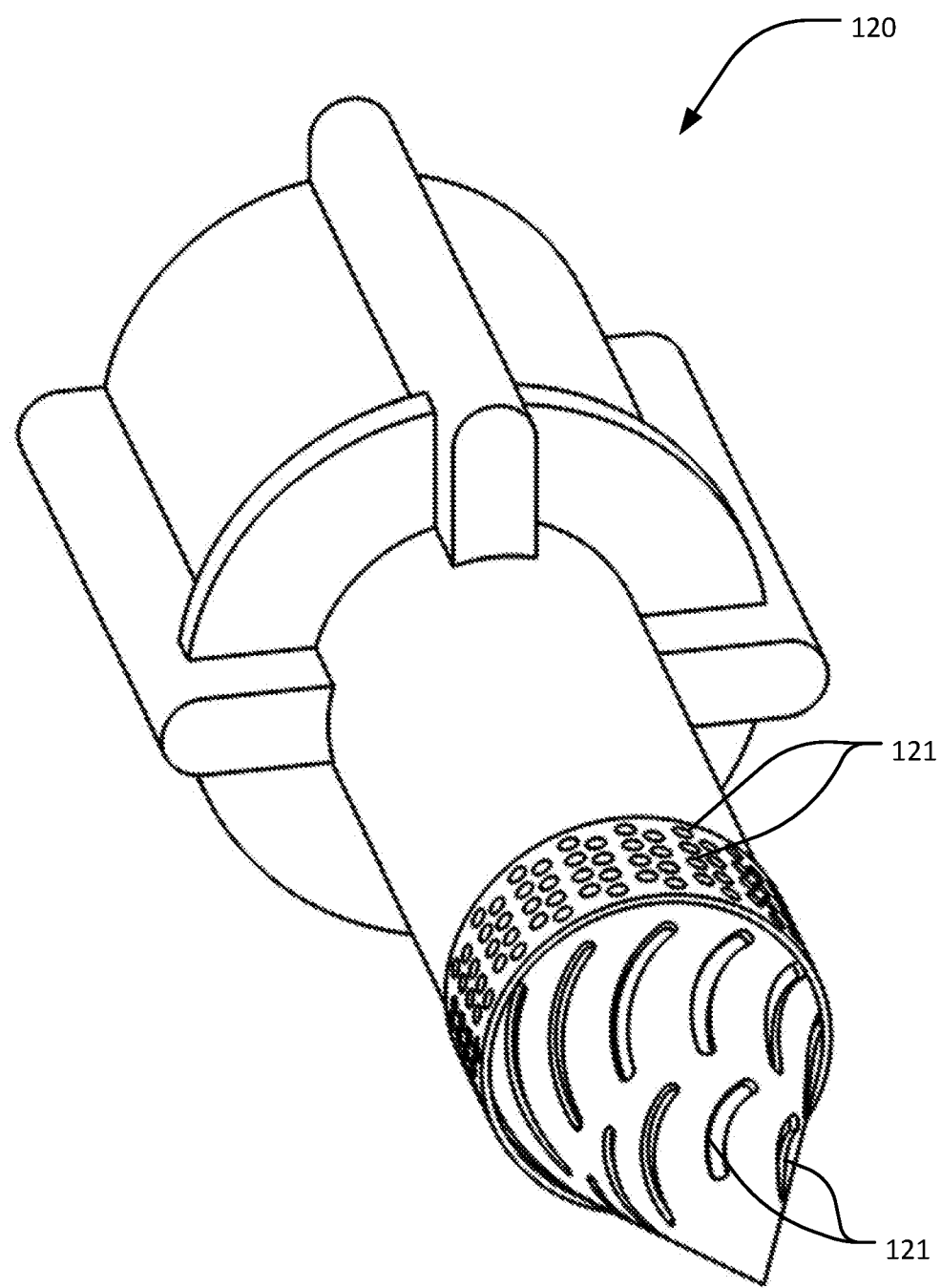
FIG. 2 illustrates a PRIOR ART insert device used in the sand trap of FIG. 1.

Fluid streams in oil and gas extraction operations are often under high pressure and carry significant amounts of sand and other particulates. The sand and particulates are erosive, and various devices have been created to separate them from the fluid. FIGS. 1 and 2 show a prior art sand trap 100 having a cylindrical vessel 110 with an axis 110'. The cylindrical vessel 110 has upper and lower portions 112, 114 separated from one another by a baffle 113. The baffle 113 has an opening 113a along the axis 110', and a removable insert 120 extends from the baffle 113 into the lower portion 114. Fluid with particulates enters into the lower portion 114 through an opening 114a. Particulates settle out and exit the lower portion 114 through exit 114b. Fluid passes through openings 121 in the removable insert 120 and travels through the removable insert 120 to the upper portion 112 and exits through an opening 112a.

FIGS. 3 through 12 illustrate a sand trap 200, according to an embodiment of the current invention. While FIGS. 3 through 11 illustrate one embodiment drawn to scale, other embodiments have different angles, proportions, et cetera apart from those in the figures. The sand trap 200 broadly includes a skid 210, a cylindrical vessel 220 with a diverter 230, piping 250, and a choke assembly 260. Notably, embodiments of the current invention do not include any removable insert in the cylindrical vessel 220 for separating sand and particulates, and do not include a baffle separating upper and lower portions of the vessel between a fluid and particulate inlet and a fluid outlet as in FIG. 1.

Figure 3:
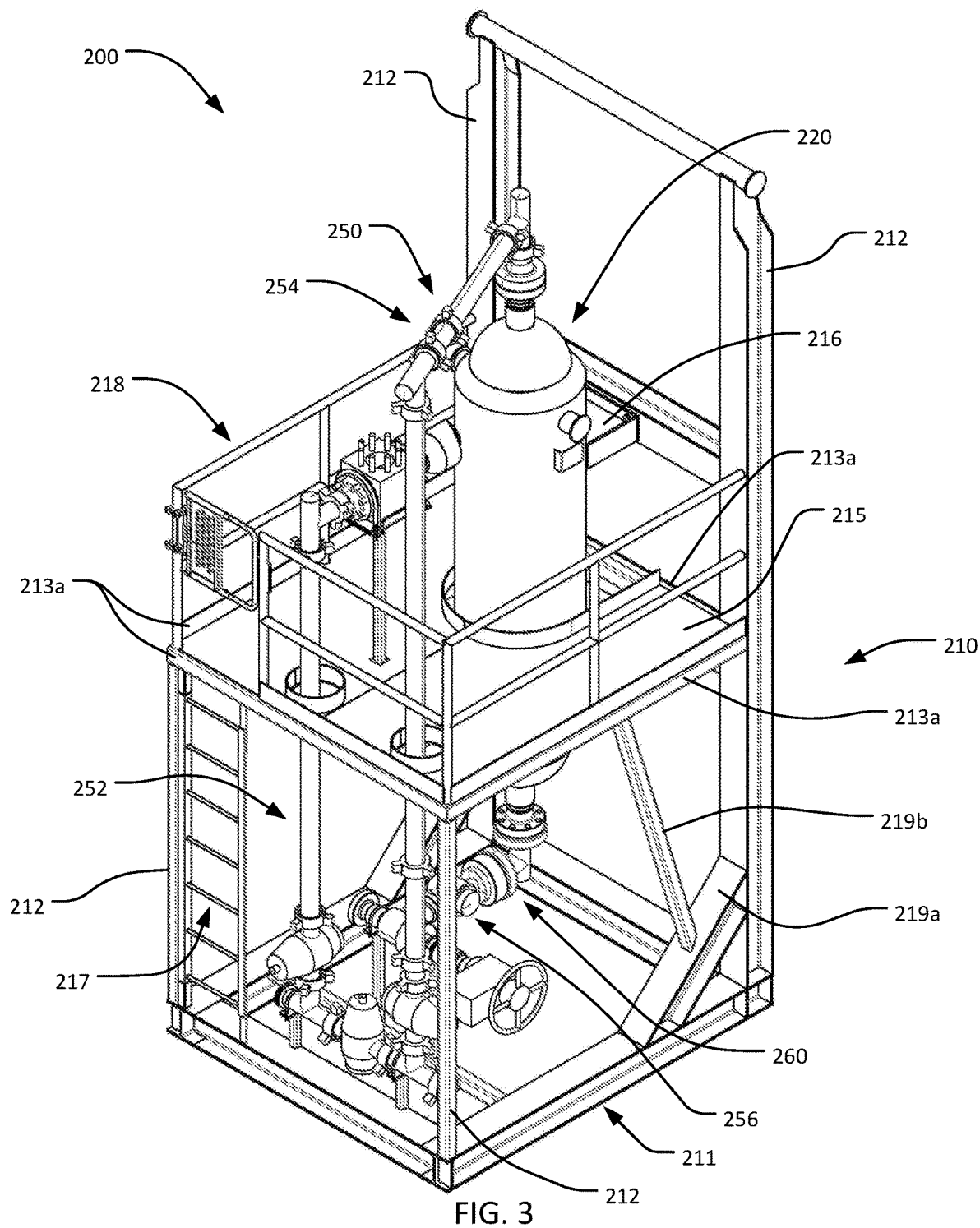
FIG. 3 is a perspective view showing a sand trap according to an embodiment of the current invention.
Figure 4:
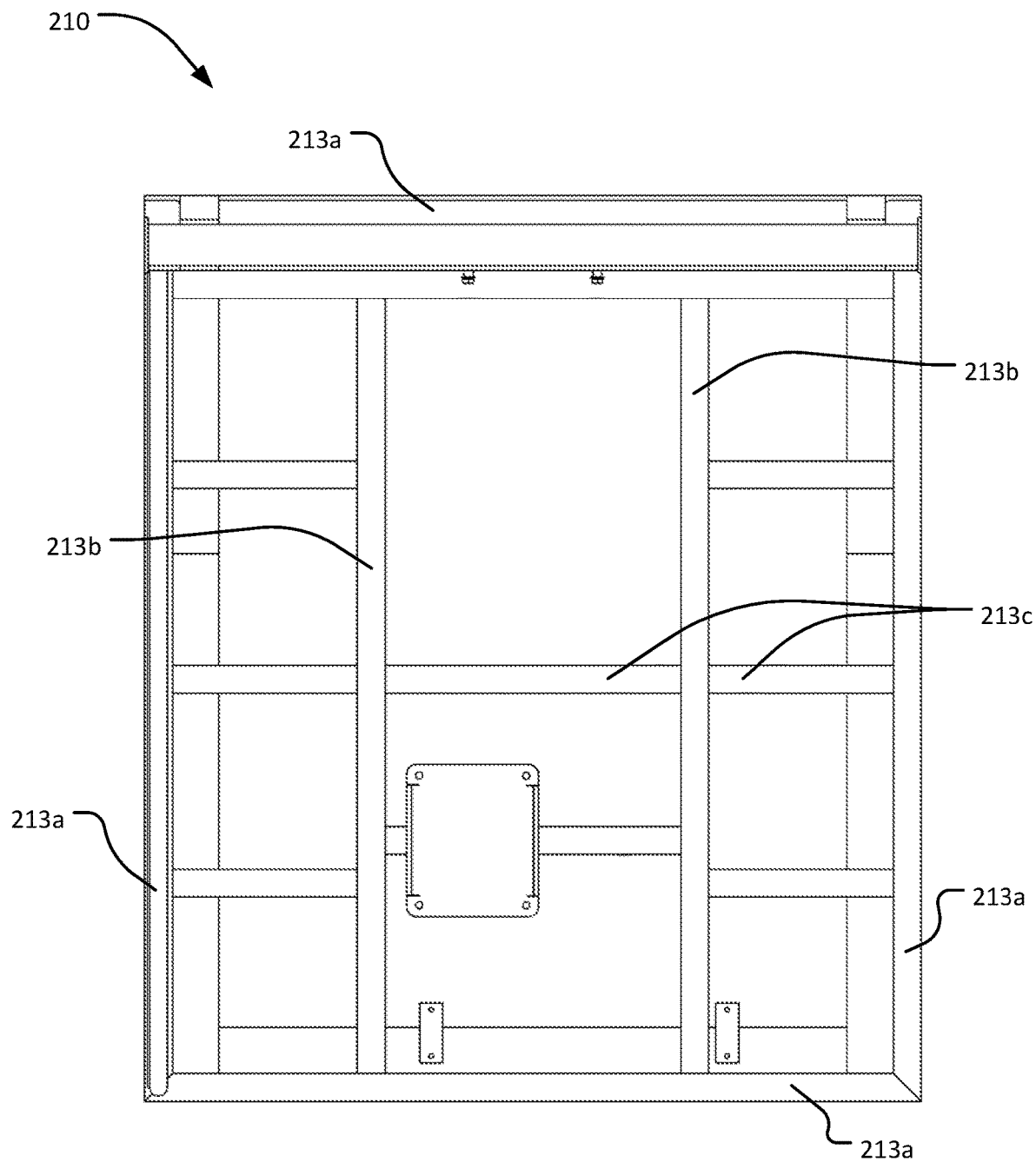
FIG. 4 is a top view showing part of a skid from the sand trap of FIG. 3.

The skid 210, best shown in FIGS. 3 and 4, has a base 211, posts 212, rim joists 213a supported by the posts 212, floor joists 213b and bridging 213c supported by the rim joists 213a, decking 215 supported by the floor joists 213b and bridging 213c, a cantilevered support 216 supported by at least one of the posts 212, a ladder 217 providing access for a person to walk on the decking 215, and safety railing 218 to enclose at least part of an area over the decking 215.

Bracing 219a extends between the base 211 and the posts 212 to reinforce the posts 212, and struts 219b extends between the bracing 219a and the floor joists 213b to reinforce the floor joists 213b. The components of the skid 210 may be constructed of metal (e.g., steel) or any other appropriate material. While one cantilevered support 216 is shown positioned above the decking 215, in other embodiments the cantilevered support 216 may be below the decking 215 or multiple cantilevered supports 216 may be included (either above or below the decking 215).

The cylindrical vessel 220 has upper and lower ends 220a, 220b and a longitudinal axis 220' that extends generally vertically. As shown in FIG. 3, the cylindrical vessel 220 may be supported by the skid 210 such that the lower end 220b is raised above the base 211. For example, the cylindrical vessel 220 may be attached (e.g., welded or otherwise fastened) to the collar 214 and the support 216.

Figure 8:
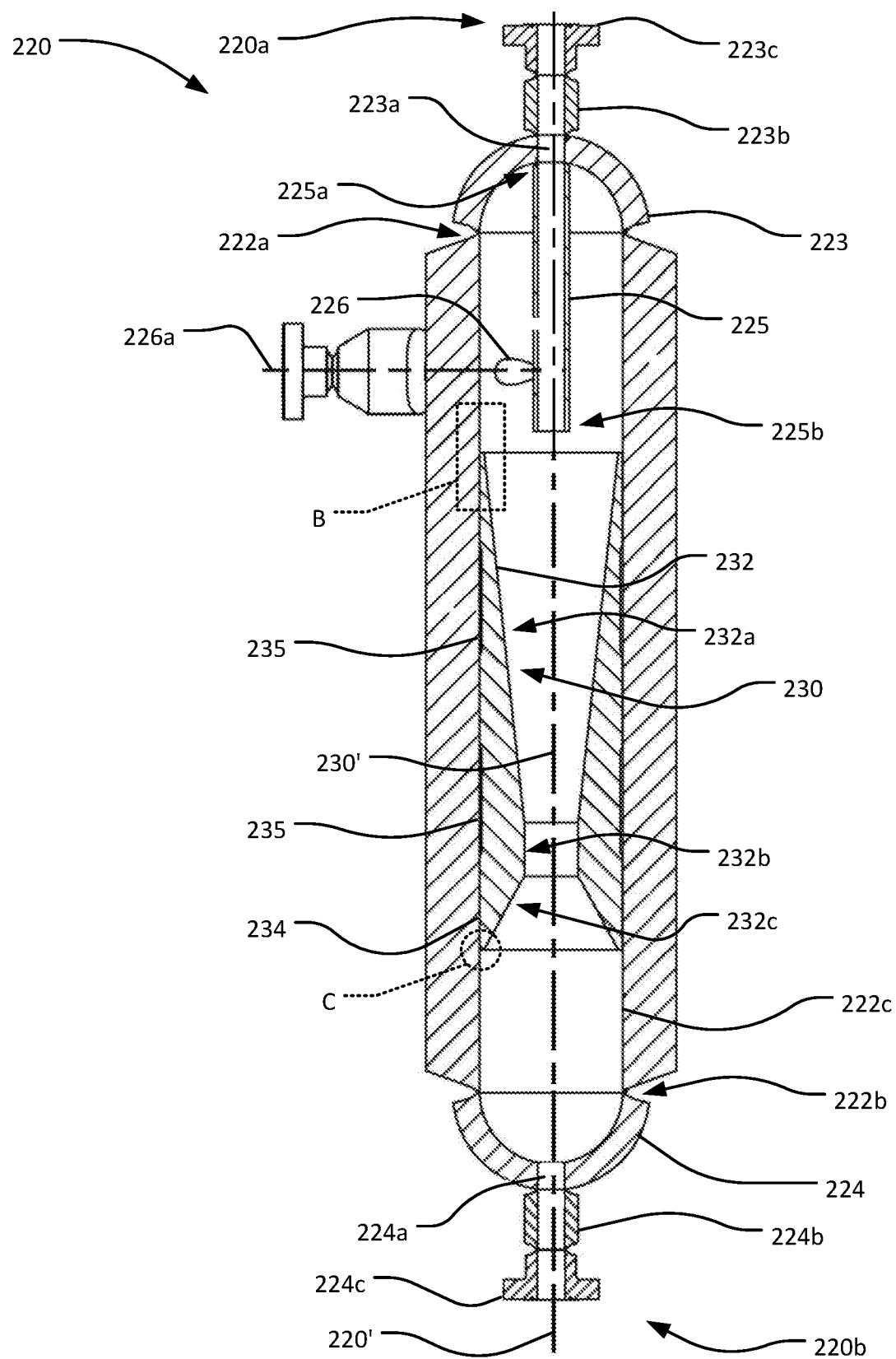
FIG. 8 is a side section view taken along line A of FIG. 5.

FIGS. 3 and 5 through 10 show the cylindrical vessel 220, which has a hollow cylindrical wall 222 with upper and lower ends 222a, 222b and inner and outer faces 222c, 222d. An upper cap 223 is coupled to the cylindrical wall upper end 222a, and a lower cap 224 is coupled to the cylindrical wall lower end 222b. It may be particularly desirable for the caps 223, 224 to be generally dome-shaped as shown in the figures, and the caps 223, 224 may be coupled to the wall 222 in any appropriate manner, such as through welding, threading, et cetera. Each cap 223, 224 may include a respective opening 223a, 224a located along the longitudinal axis 220', and a respective nozzle 223b, 224b may extend from each opening 223a, 224a along the longitudinal axis 220' and lead to a respective attachment flange 223c, 224c. In some embodiments, the upper cap 223, the nozzle 223b, and the attachment flange 223c may be generally the same as or identical to the lower cap 224, the nozzle 224b, and the attachment flange 224c. And, as shown in FIG. 8, the sand trap 100 may be unobstructed along the longitudinal axis 220' of the cylindrical vessel 220 from the upper cap opening 223a to the lower cap opening 224a. A hollow vent pipe 225 extends along the longitudinal axis 220' inside the wall 222 to the opening 223a in the upper cap 223. The vent pipe 225 has open upper and lower ends 225a, 225b, with the open upper end 225a being adjacent the opening 223a, and the upper end 225a may be welded, threaded, or otherwise coupled to or formed with the upper cap 223.

Figure 5:
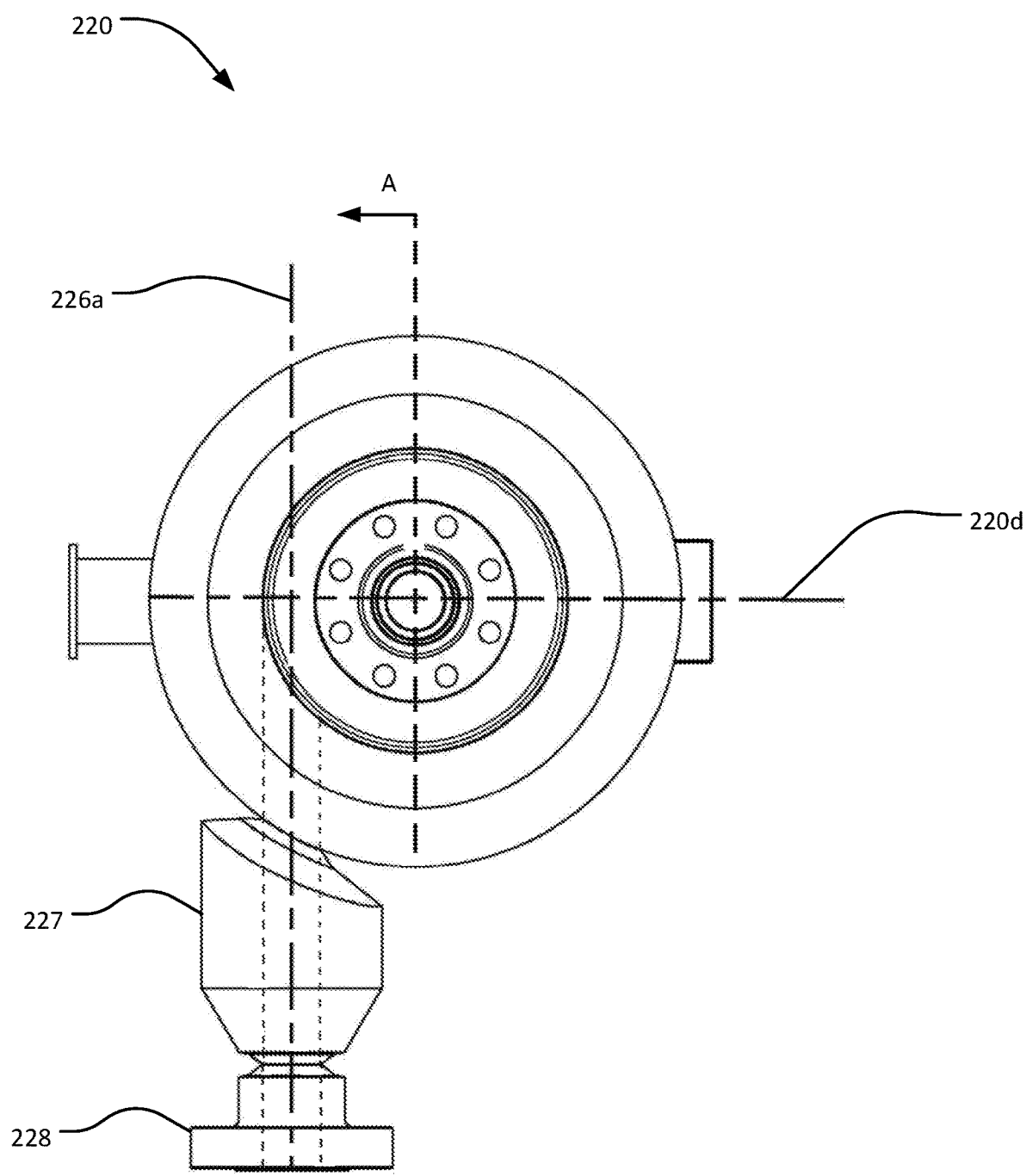
FIG. 5 is a top view showing a cylindrical vessel from the sand trap of FIG. 3.
Figure 6:
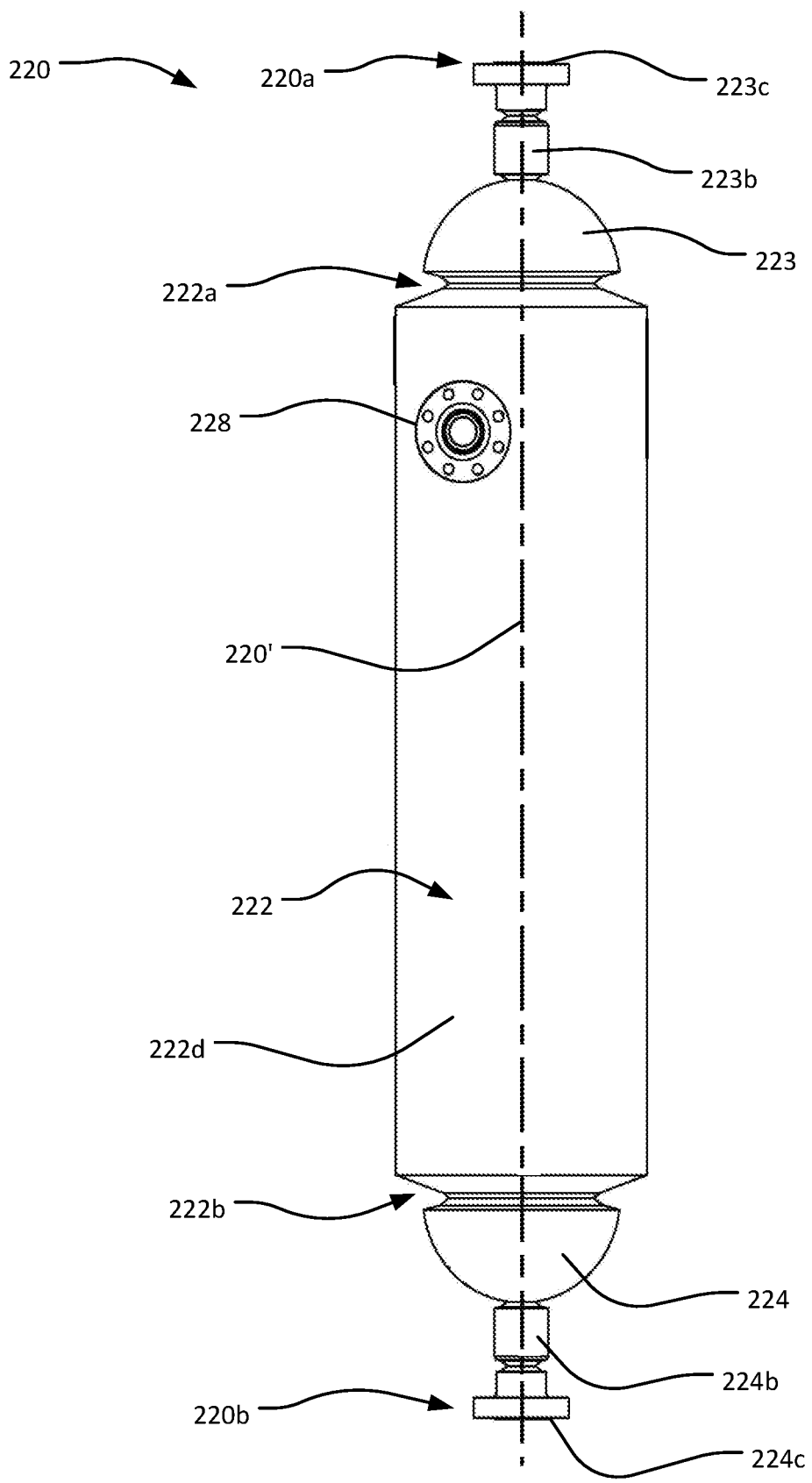
FIG. 6 is a front view showing the cylindrical vessel of FIG. 5.
Figure 7:
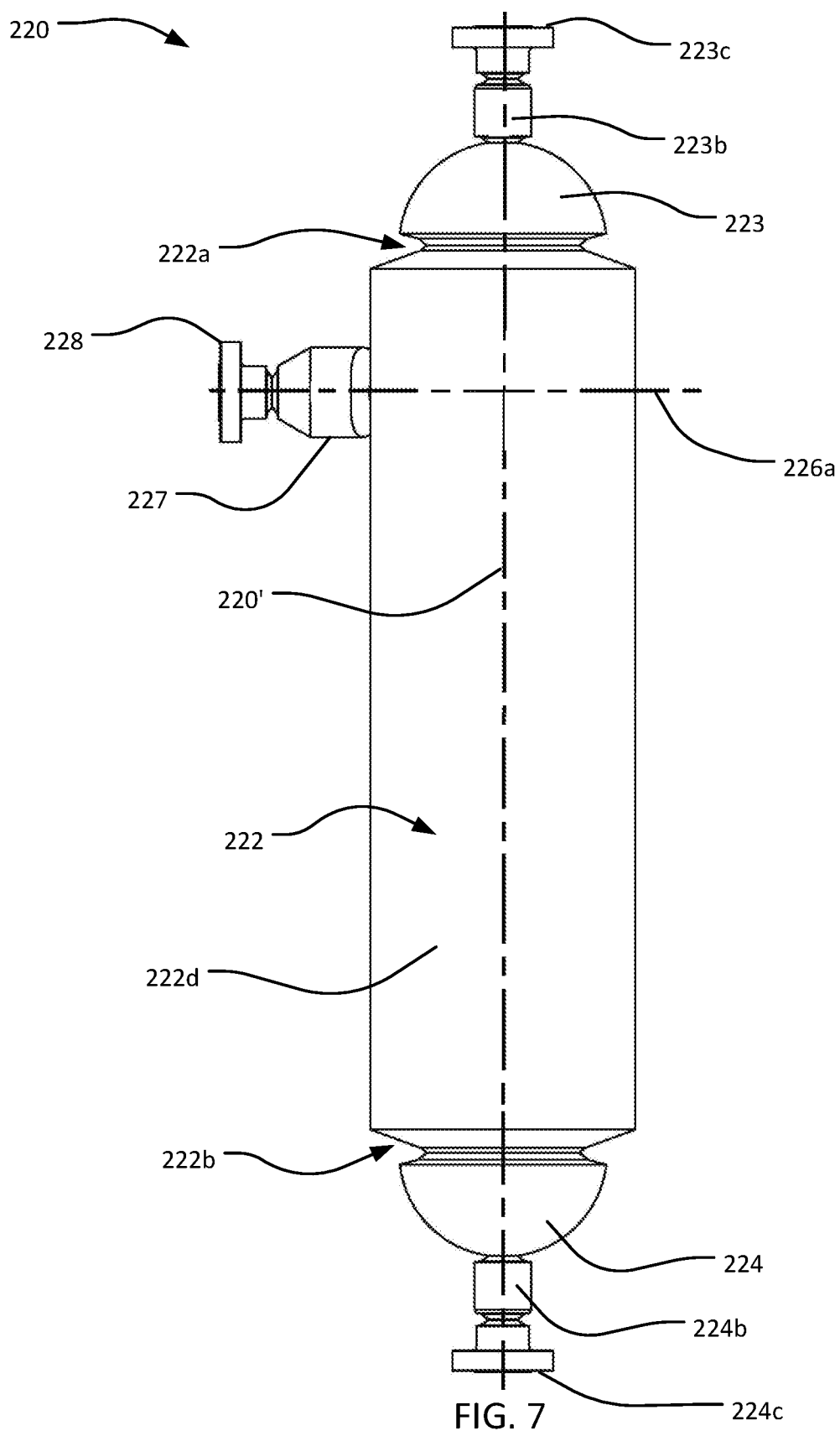
FIG. 7 is a side view showing the cylindrical vessel of FIG. 5.

The cylindrical wall 222 has an inlet opening 226 (FIG. 8) with an axis 226a that is perpendicular but askew to the longitudinal axis 220'. Said differently, the inlet opening axis 226a is perpendicular to an axis 220d (FIG. 5) that is perpendicular to the longitudinal axis 220'. This is best shown in FIGS. 5, 6, and 8. A nozzle 227 extends from the inlet opening 226 along the axis 226a, and the nozzle 227 leads to an attachment flange 228.

Figure 9:
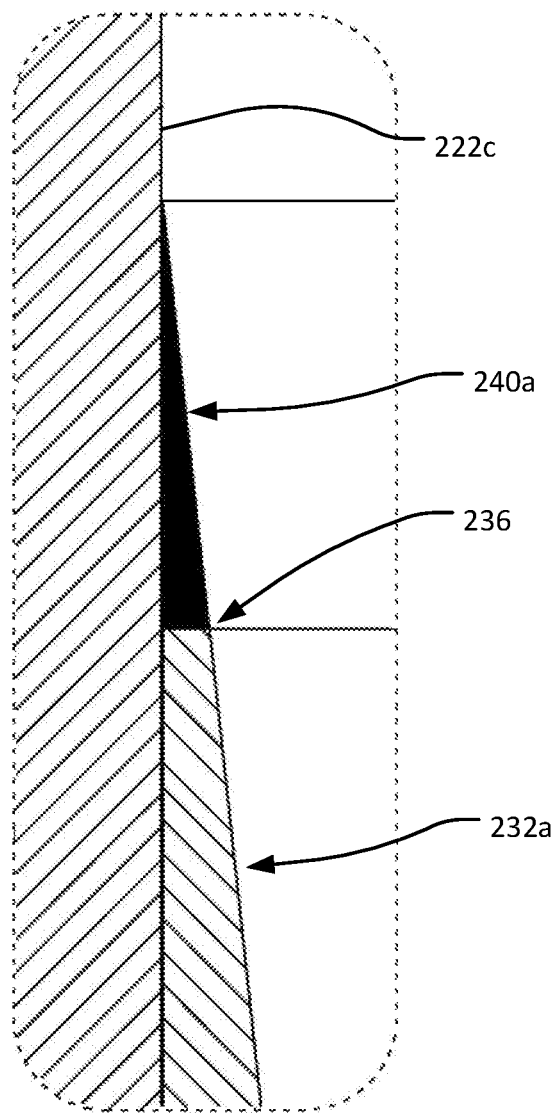
FIG. 9 is a section view taken along line B of FIG. 8.
Figure 10:
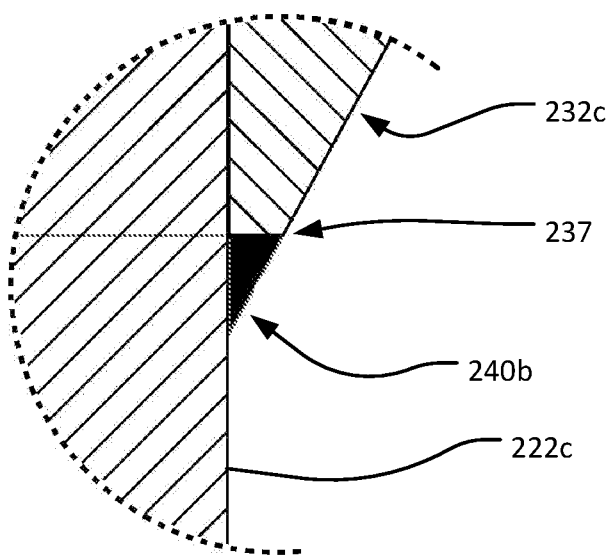
FIG. 10 is a section view taken along line C of FIG. 8.

Focus is now directed to the diverter 230, shown in FIGS. 8 through 10. The diverter 230 is annular with inner and outer walls 232, 234 and top and bottom ends 236, 237 and has a longitudinal axis 230' that is coaxial with the longitudinal axis 220'. The inner wall 232 has an upper portion 232a that narrows to a choke area 232b and a lower portion 232c flaring out from the choke area 232b toward the vessel lower end 220b. It may be desirable for the choke area 232b to have a generally consistent inner diameter or for the choke area 232b to narrow from the upper portion 232a to the lower portion 232c, though in some embodiments the choke area 232b may flare from the upper portion 232a to the lower portion 232c or be a single point. As shown in FIG. 8, the choke area 232b may be sized such that a smallest inner diameter of the choke area 232b is larger than the lower cap opening 224a. Contours of the upper portion 232a, the choke area 232b, and the lower portion 232c may be generally linear, concave, convex, helical, or as otherwise desired.

It may be desirable for an overall angle of the upper portion 232a (i.e., an angle defined relative to the longitudinal axis 230' by a straight line drawn from the inner wall 232 at the top end 236 to a point where the upper portion 232a meets the choke area 232b; since the upper portion 232a is generally linear in FIG. 8, this is the angle of the upper portion 232a relative to the longitudinal axis 230') to be between 4 and 10 degrees, more preferable to be between 4 and 8 degrees, and even more preferable to be between 4 and 7 degrees. Example overall angles of the upper portion 232a include 5 degrees (or about 5 degrees) and more desirably 6 degrees (or about 6 degrees). It may be desirable for an overall angle of the lower portion 232c (i.e., an angle defined relative to the longitudinal axis 230' by a straight line drawn from the inner wall 232 at the bottom end 237 to a point where the lower portion 232c meets the choke area 232b; since the lower portion 232c is generally linear in FIG. 8, this is the angle of the lower portion 232c relative to the longitudinal axis 230') to be between 25 and 35 degrees, more preferable to be between 25 and 32 degrees, and even more preferable to be between 27 and 30 degrees. Example overall angles of the lower portion 232c include 30 degrees (or about 30 degrees) and more desirably 29 degrees (or about 29 degrees). In some embodiments, the overall angle of the lower portion 232c may be about 4 to 6 times as large, and more particularly about 4½ to 5 times as large, as the overall angle of the upper portion 232a.

The diverter outer wall 234 has an outer diameter that is the same size as, or only slightly smaller than, an inner diameter of the cylindrical wall inner face 222c. And, though the diverter 230 and the cylindrical wall 222 may be constructed from different materials, it may be particularly desirable for the diverter 230 and the cylindrical wall 222 to be constructed from the same material (for example, steel). The outer wall 234 is shown having a pair of grooves 235 that may each reduce friction and heat buildup when the diverter 230 is inserted into the cylindrical wall 222 during manufacture as described below.

As shown in FIGS. 9 and 10, the top and bottom ends 236, 237 of the diverter 230 may be truncated to allow for welding 240a, 240b to affix the diverter 230 to the cylindrical wall inner face 222c while maintaining the contour of the upper and lower portions 232a, 232c. The top end 236 is positioned below the inlet opening 226 of the cylindrical wall 222 (i.e., between the inlet opening 226 and the vessel lower end 220b) as shown in FIG. 8, and it may be desirable for a distance between the inlet opening axis 226a and the top end 236 to be less than or equal to about 50% to 65% as much as, or more preferable about 55% to 60% as much as, a distance between the inlet opening axis 226a and the cylindrical wall upper end 222a.

It may be desirable for a longitudinal length of the upper portion 232a (i.e., a length of the upper portion 232a along the longitudinal axis 230') to be about 30% to 50% as long as a length of the cylindrical wall 222 (i.e., a length between the upper and lower ends 222a, 222b), more preferable about 40% to 50% as long, and even more preferable about 42% to 45% as long. It may be desirable for a longitudinal length of the lower portion 232c (i.e., a length of the upper portion 232c along the longitudinal axis 230') to be about 3% to 15% as long as a length of the cylindrical wall 222 (i.e., a length between the upper and lower ends 222a, 222b), more preferable about 5% to 10% as long, and even more preferable about 7% to 10% as long. In some embodiments, the longitudinal length of the upper portion 232a may be about 4½ to 5½ times as large, and more preferable about 5 times as large, as the longitudinal length of the lower portion 232c. A longitudinal length of the choke area 232b (i.e., a length of the choke area 232b along the longitudinal axis 230') is less than the longitudinal length of the upper portion 232a and less than the longitudinal length of the lower portion 232c. It may be desirable for the longitudinal length of the choke area 232b to be no more than about 60% to 75% as long as the longitudinal length of the lower portion 232c, and more preferable no more than about 75% as long as the longitudinal length of the lower portion 232c.

A length of the diverter 230 (i.e., a length between the top and bottom ends 236, 237) may be, for example, 50% to 75% as long as the length of the cylindrical wall 222, and more preferable about 65% to 70% as long. It may be desirable for a distance between the cylindrical wall lower end 222b and the diverter bottom end 237 to be smaller than a distance between the cylindrical wall upper end 222a and the diverter top end 236, and more preferable about 65% as long. As shown in FIG. 8, the vent pipe lower end 225b may be located between the inlet opening 226 and the diverter top end 236.

Attention is now directed back to FIG. 3, which illustrates the piping 250. The piping 250 broadly includes piping 252 for delivering under high pressure fluid and particulates from oil and gas extraction operations, piping 254 for passing fluid from the cylindrical vessel 220 after particulates have been separated out, and piping 256 for passing particulates from the cylindrical vessel 220. As those skilled in the art will appreciate, the piping 250 may include pipes, valves, et cetera.

Figure 11:
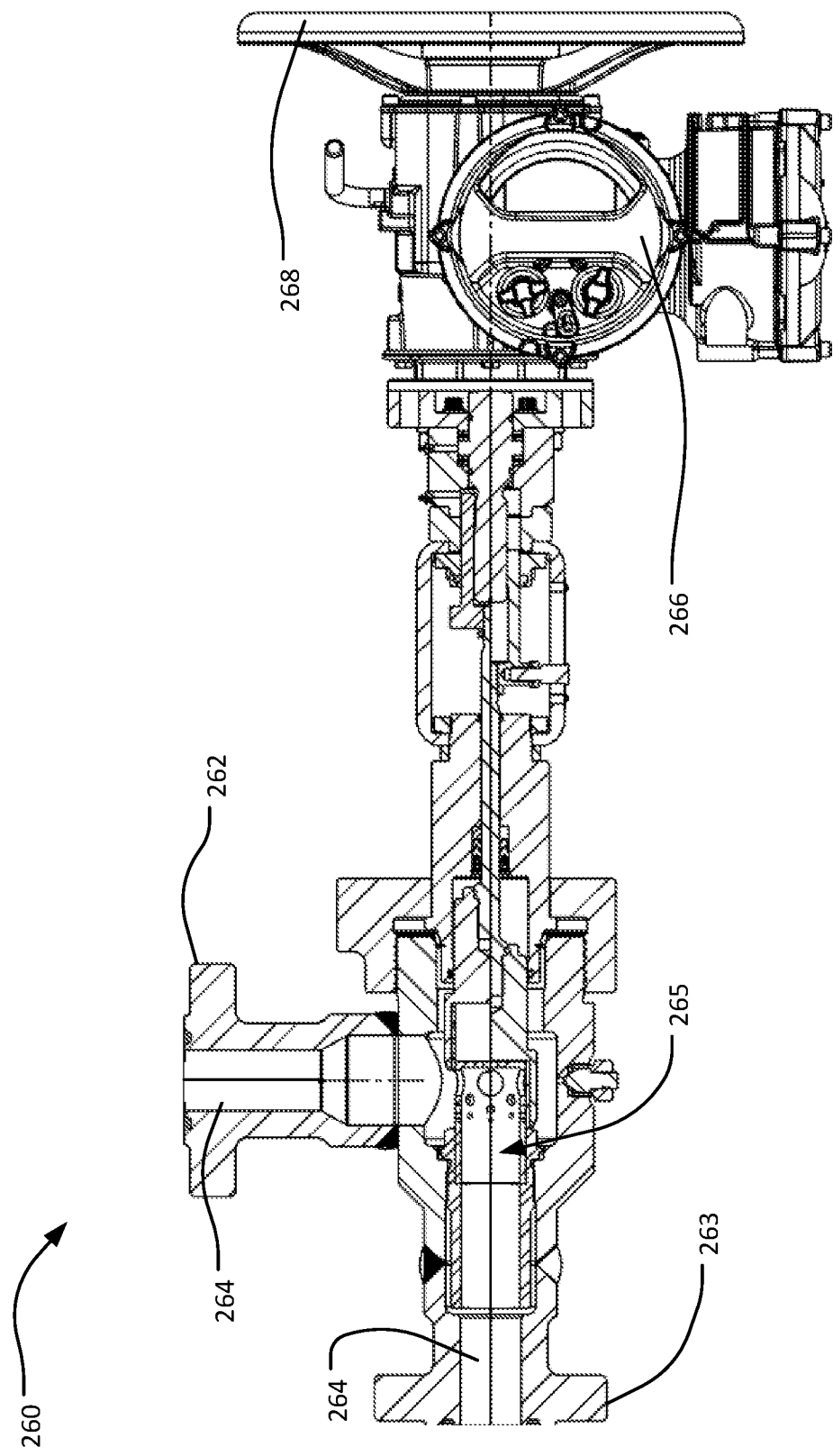
FIG. 11 is a side view showing a choke assembly from the sand trap of FIG. 3, with part shown in section along a centerline.
Figure 12:
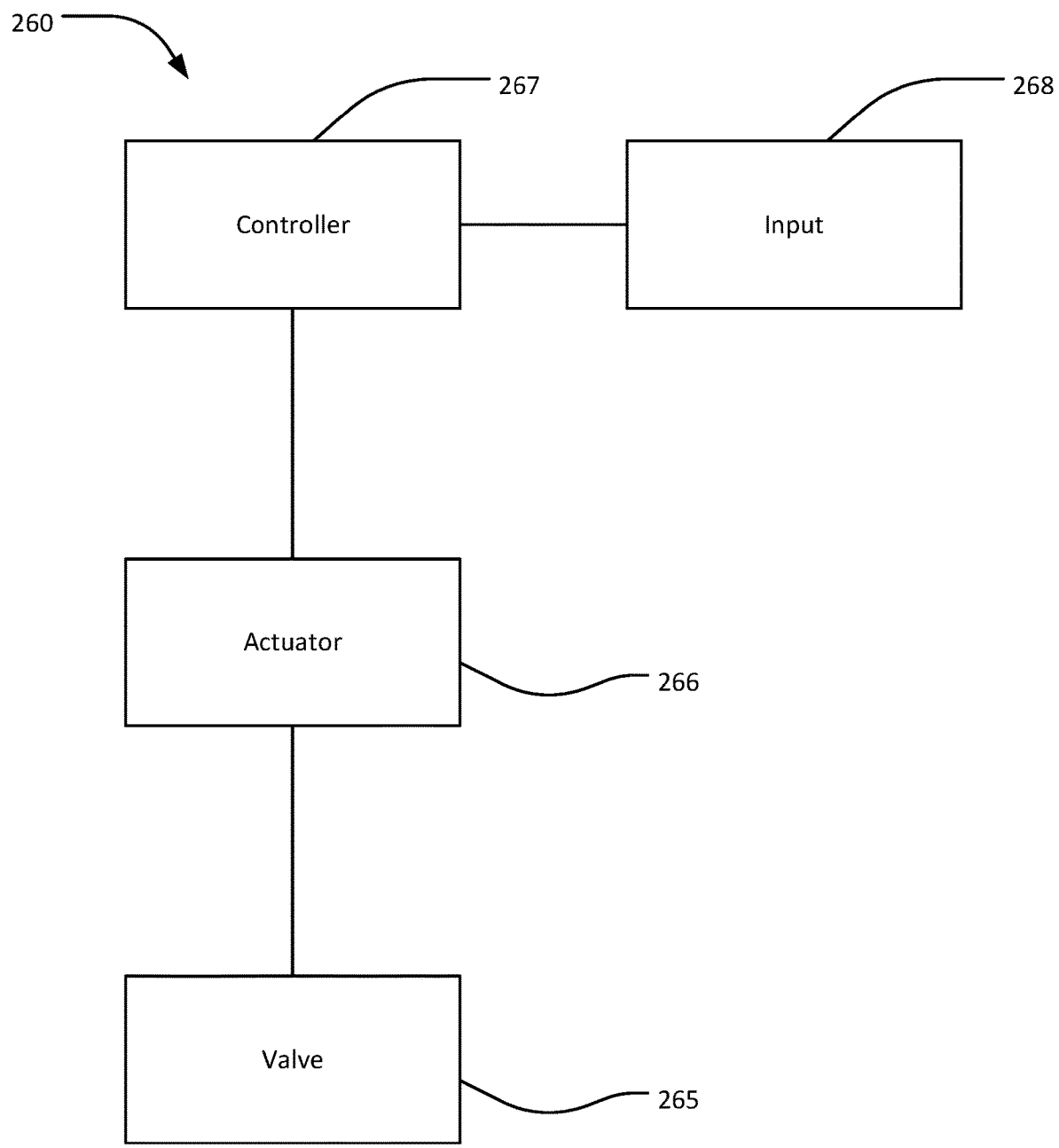
FIG. 12 is a block diagram showing some components of the choke assembly of FIG. 11.

The choke assembly 260 is shown in FIGS. 3, 11, and 12 and selectively allows particulates to pass from the cylindrical vessel 110 through the piping 256. As those skilled in the art will appreciate, operation of the choke assembly 260 affects parameters in the cylindrical vessel 220 (e.g., pressure); and while excessive amounts of particulate in the cylindrical vessel 220 are detrimental to the sand trap's filtering ability, unrestricted flow through the lower cap opening 224a may also be undesirable for creating proper parameters in the cylindrical vessel 220 for filtering. The choke assembly 260 broadly includes an intake attachment flange 262 and an output attachment flange 263 with a passage 264 extending therebetween, a valve 265 for selectively restricting flow through the passage 264, an actuator 266 for operating the valve 265, a controller 267 for controlling the actuator 266, and at least one input 268 in communication with the controller 267.

The intake attachment flange 262 is configured to mount to the attachment flange 224c or to part of the piping 256, and the output attachment flange 263 is configured to mount to the piping 256. It may be desirable for the flange 262 to be mounted directly to the flange 224c such that part of the passage 264 extends generally vertically, though other configurations and positionings are acceptable. It may be particularly desirable for the valve 265 to be a stem-in-cage valve, as the cage may help reduce flow through the valve 265 when the valve 265 is at an open position and thus prevent erosion. Nevertheless, other types of valves 265 may be used in various embodiments of the current invention.

The actuator 266 may operate the valve 265 through any appropriate manner, whether now known or later developed. For example, the actuator 266 may be a mechanical or hydraulic actuator 266. As shown in FIG. 12, the controller 267 ultimately controls the actuator 266. The controller 267 may be housed with or positioned separate from the actuator 266 and may include a processor in data communication with non-transitory computer memory having programming instructions.

In some embodiments, the instructions allow for multiple modes of operation. For example, in one mode, a user may select (using the input 268, which may for example be a touchscreen, switch, knob, application on a mobile phone, etc.) when the actuator 266 is to move the valve 265 from a closed position to the open position, and how long the valve 265 is to remain at the open position. This selection may be time based (e.g., every x minutes the valve 265 is to open for y seconds) or may be based on data (which here acts as the input 268) received from sensors (e.g., in the cylindrical vessel 220 or downhole). For example, once a certain amount of particulates is contained in the cylindrical vessel 220, the valve 265 is to open for a certain amount of time; once pressure or flow rate in the cylindrical vessel 220 meets certain parameters, the valve 265 is to open for a certain amount of time; when pressure, temperature, and/or solid acquisition data from the well meets certain parameters, the valve 265 is to open for a certain amount of time; et cetera. Alternately, the user may only select between modes of operation without selecting parameters (e.g., the user may select between time-based operation, cylindrical vessel data operation, well data operation, et cetera, without selecting the associated parameters), or the controller 267 may operate without any user input. It may be particularly desirable for the controller 267 to allow for a manual override to move the valve 265 to the open position. Handle 268a is shown in FIG. 11 for operating the manual override.

The sand trap 200 may be manufactured in various ways. In one embodiment, the diverter 230 is inserted through the cylindrical wall upper or lower end 222a, 222b (the lower end 222b may, though need not be, preferred) with the axes 220', 230' being coaxial. Once the diverter 230 is positioned as desired, the welding 240a, 240b affixes the diverter 230 to the cylindrical wall inner face 222c while maintaining the contour of the upper and lower portions 232a, 232c. The upper cap 223, the nozzle 223b, the attachment flange 223c, and the hollow vent pipe 225 are coupled together, and the upper cap 223 is coupled to the cylindrical wall upper end 222a. The lower cap 224, the nozzle 224b, and the attachment flange 224c are similarly coupled together, and the lower cap 224 is coupled to the cylindrical wall lower end 222b. The attachment flange 228 is coupled to the nozzle 227, and the nozzle 227 is coupled to the inlet opening 226. The cylindrical vessel 220 is passed partway through a space between the floor joists 213b and welded to the support 216. The piping 252 is coupled to the attachment flange 228, the piping 254 is coupled to the attachment flange 223c, the choke assembly 260 is coupled to the attachment flange 224c, and the piping 256 is coupled to the choke assembly 260. One skilled in the art will appreciate that various steps described may be undertaken in different sequences and that various parts may be manufactured together.

In use, the piping 252 delivers (under high pressure) fluid and particulates from oil and gas extraction operations to the inlet opening 226 (via the attachment flange 228 is coupled to the nozzle 227), and the fluid and particulates pass from the inlet opening 226 to inside the cylindrical wall 222 above the vent pipe lower end 225b. The positioning of the inlet opening 226 causes the fluid and particulates to rotate inside the cylindrical wall 222 in a cyclonic or helical manner, and gravity causes the particulates to filter through the diverter 230. The shape and location of the diverter 230 may be particularly useful in allowing the particulates to pass through the choke area 232b and the lower portion 232c while causing the fluid to exit through the vent pipe 225 (and ultimately the nozzle 223b, the attachment flange 223c, and the piping 254). The particulates passed through the diverter 230 are selectively output through the piping 256 (via the lower cap opening 224a, the nozzle 224b, and the attachment flange 224c) by the choke assembly 260 as described above. The skid 210 may provide a convenient, robust package for delivering and moving the cylindrical vessel 220 and the diverter 230, and may allow easy access to various components of the sand trap 200.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims.

The invention claimed is:

1. A sand trap for use in oil and gas extraction operations, the sand trap comprising: a cylindrical vessel for receiving a high pressure fluid stream with particulates, the cylindrical vessel having a longitudinal axis extending generally vertically, the cylindrical vessel comprising:
    a hollow cylindrical wall having upper and lower ends, inner and outer faces, and an inlet opening with an axis generally perpendicular to but askew to the longitudinal axis of the cylindrical vessel;
    an upper cap extending from the cylindrical wall upper end, the upper cap having an opening along the longitudinal axis of the cylindrical vessel;
    a vent pipe having an upper end extending from the upper cap opening and a lower end between the upper cap and the cylindrical wall lower end;
    a lower cap extending from the cylindrical wall lower end, the lower cap having an opening along the longitudinal axis of the cylindrical vessel;
    an annular diverter comprising:
        a longitudinal axis coaxial with the longitudinal axis of the cylindrical vessel;
        an outer wall inwardly adjacent the inner face of the hollow cylindrical wall;
        an inner wall having an upper portion that narrows to a choke area and a lower portion flaring out from the choke area toward the cylindrical wall lower end, the inner wall upper portion having a generally linear contour, the inner wall lower portion having a generally linear contour, the choke area having a generally consistent inner diameter from the inner wall upper portion to the inner wall lower portion;
        a top end welded to the cylindrical wall inner face; and
        a bottom end welded to the cylindrical wall inner face.

2. A sand trap for use in oil and gas extraction operations, the sand trap comprising: a cylindrical vessel for receiving a high pressure fluid stream with particulates, the cylindrical vessel having a longitudinal axis extending generally vertically, the cylindrical vessel comprising:
    a hollow cylindrical wall having upper and lower ends, inner and outer faces, and an inlet opening with an axis generally perpendicular to but askew to the longitudinal axis of the cylindrical vessel;
    an upper cap extending from the cylindrical wall upper end, the upper cap having an opening along the longitudinal axis of the cylindrical vessel;
    a vent pipe having an upper end extending from the upper cap opening and a lower end between the upper cap and the cylindrical wall lower end;
    a lower cap extending from the cylindrical wall lower end, the lower cap having an opening along the longitudinal axis of the cylindrical vessel;
    an annular diverter comprising:
        a longitudinal axis coaxial with the longitudinal axis of the cylindrical vessel;
        an outer wall inwardly adjacent the inner face of the hollow cylindrical wall;
        an inner wall having an upper portion that narrows to a choke area and a lower portion flaring out from the choke area toward the cylindrical wall lower end;
        a top end welded to the cylindrical wall inner face; and
        a bottom end welded to the cylindrical wall inner face;
    wherein:
        the top end of the diverter truncates a contour of the inner wall upper portion;
        welding coupling the diverter top end to the cylindrical wall inner face extends the contour of the inner wall upper portion;
        the bottom end of the diverter truncates a contour of the inner wall lower portion; and
        welding coupling the diverter bottom end to the cylindrical wall inner face extends the contour of the inner wall lower portion.

3. The sand trap of claim 1, wherein the vent pipe lower end has an opening coaxial with the longitudinal axis of the cylindrical vessel.

4. The sand trap of claim 1, wherein the vent pipe lower end is between the inlet opening and the diverter top end.

5. The sand trap of claim 1, wherein the sand trap does not have a baffle between the inlet opening and the cylindrical wall upper end.

6. A sand trap for use in oil and gas extraction operations, the sand trap comprising: a cylindrical vessel for receiving a high pressure fluid stream with particulates, the cylindrical vessel having a longitudinal axis extending generally vertically, the cylindrical vessel comprising:
    a hollow cylindrical wall having upper and lower ends, inner and outer faces, and an inlet opening with an axis generally perpendicular to but askew to the longitudinal axis of the cylindrical vessel;
    an upper cap extending from the cylindrical wall upper end, the upper cap having an opening along the longitudinal axis of the cylindrical vessel;
    a vent pipe having an upper end extending from the upper cap opening and a lower end between the upper cap and the cylindrical wall lower end;
    a lower cap extending from the cylindrical wall lower end, the lower cap having an opening along the longitudinal axis of the cylindrical vessel;
    an annular diverter comprising:
        a longitudinal axis coaxial with the longitudinal axis of the cylindrical vessel:
        an outer wall inwardly adjacent the inner face of the hollow cylindrical wall;
        an inner wall having an upper portion that narrows to a choke area and a lower portion flaring out from the choke area toward the cylindrical wall lower end, the inner wall upper portion having a generally linear contour, the inner wall lower portion having a generally linear contour, the choke area narrowing from the inner wall upper portion to the inner wall lower portion;
a top end welded to the cylindrical wall inner face; and
a bottom end welded to the cylindrical wall inner face.

7. The sand trap of claim 6, wherein:
an overall angle of the inner wall upper portion is between 4 and 10 degrees; and
an overall angle of the inner wall lower portion is between 25 and 35 degrees.

8. The sand trap of claim 1, wherein:
an overall angle of the inner wall upper portion is between 4 and 8 degrees; and
an overall angle of the inner wall lower portion is between 25 and 32 degrees.

9. The sand trap of claim 8, wherein a length of the diverter is between 50% and 75% as long as a length of the cylindrical wall.

10. The sand trap of claim 9, wherein a longitudinal length of the inner wall upper portion is about five times as large as a longitudinal length of the inner wall lower portion.

11. The sand trap of claim 1, wherein:
a length of the diverter is between 50% and 75% as long as a length of the cylindrical wall; and
a distance between the diverter bottom end and the cylindrical wall lower end is less than a distance between the diverter top end and the cylindrical wall upper end.

12. The sand trap of claim 1, wherein the diverter outer wall includes an annular groove defining an area where the diverter does not touch the cylindrical wall inner face.

13. The sand trap of claim 1, wherein:
the upper cap has generally dome-shaped internal and external faces; and
the lower cap has generally dome-shaped internal and external faces.

14. The sand trap of claim 1, further comprising a skid supporting the cylindrical vessel, the skid having elevated decking from which the cylindrical vessel is accessible.

15. The sand trap of claim 1, further comprising a choke assembly selectively allowing the particulates to exit the cylindrical vessel, the choke assembly comprising:
a passage;
a valve selectively restricting flow through the passage;
an actuator operating the valve; and
a controller controlling the actuator.

16. The sand trap of claim 15, wherein the choke assembly further comprises a user input to select between a time-based mode of the controller controlling the actuator and at least one of the following modes of the controller controlling the actuator:
a mode using sensor data from the cylindrical vessel; and
a mode using well data.

17. A sand trap for use in oil and gas extraction operations, the sand trap comprising: a cylindrical vessel for receiving a high pressure fluid stream with particulates, the cylindrical vessel having a longitudinal axis extending generally vertically, the cylindrical vessel comprising:
a hollow cylindrical wall having upper and lower ends, inner and outer faces, and an inlet opening with an axis generally perpendicular to but askew to the longitudinal axis of the cylindrical vessel;
an upper cap extending from the cylindrical wall upper end, the upper cap having an opening along the longitudinal axis of the cylindrical vessel;
a lower cap extending from the cylindrical wall lower end, the lower cap having an opening along the longitudinal axis of the cylindrical vessel;
an annular diverter having top and bottom ends and comprising:
a longitudinal axis coaxial with the longitudinal axis of the cylindrical vessel;
an outer wall inwardly adjacent and permanently extending from the inner face of the hollow cylindrical wall; and
an inner wall having an upper portion that narrows to a choke area and a lower portion flaring out from the choke area toward the cylindrical wall lower end; the inner wall upper portion having a generally linear contour; the inner wall lower portion having a generally linear contour; the choke area narrowing from the inner wall upper portion to the inner wall lower portion or having a generally consistent inner diameter from the inner wall upper portion to the inner wall lower portion; and
a vent pipe having an upper end extending from the upper cap opening and a lower end between the upper cap and the diverter top end.

18. The sand trap of claim 17, wherein the sand trap is unobstructed along the longitudinal axis of the cylindrical vessel from the upper cap opening to the lower cap opening.

19. A sand trap for use in oil and gas extraction operations, the sand trap comprising: a cylindrical vessel for receiving a high pressure fluid stream with particulates, the cylindrical vessel having a longitudinal axis extending generally vertically, the cylindrical vessel comprising:
a hollow cylindrical wall having upper and lower ends, inner and outer faces, and an inlet opening with an axis generally perpendicular to but askew to the longitudinal axis of the cylindrical vessel;
an upper cap extending from the cylindrical wall upper end, the upper cap having an opening along the longitudinal axis of the cylindrical vessel;
a lower cap extending from the cylindrical wall lower end, the lower cap having an opening along the longitudinal axis of the cylindrical vessel;
an annular diverter having top and bottom ends and comprising:
a longitudinal axis coaxial with the longitudinal axis of the cylindrical vessel;
an outer wall inwardly adjacent and permanently extending from the inner face of the hollow cylindrical wall; and
an inner wall having an upper portion that narrows to a choke area and a lower portion flaring out from the choke area toward the cylindrical wall lower end; and
a vent pipe having an upper end extending from the upper cap opening and a lower end between the upper cap and the diverter top end;
wherein:
the top end of the diverter truncates a contour of the inner wall upper portion;
welding coupling the diverter top end to the cylindrical wall inner face extends the contour of the inner wall upper portion;
the bottom end of the diverter truncates a contour of the inner wall lower portion; and
welding coupling the diverter bottom end to the cylindrical wall inner face extends the contour of the inner wall lower portion.

20. The sand trap of claim 17, wherein:
an overall angle of the inner wall upper portion is between 4 and 8 degrees;
an overall angle of the inner wall lower portion is between 25 and 32 degrees; and
a longitudinal length of the inner wall upper portion is about five times as large as a longitudinal length of the inner wall lower portion.

21. The sand trap of claim 17, further comprising a skid supporting the cylindrical vessel, the skid having elevated decking from which the cylindrical vessel is accessible.

22. The sand trap of claim 21, wherein the skid has a cantilevered support welded to the cylindrical vessel.

23. The sand trap of claim 17, further comprising a choke assembly selectively allowing the particulates to exit the cylindrical vessel, the choke assembly comprising:
a passage;
a valve selectively restricting flow through the passage;
an actuator operating the valve; and
a controller controlling the actuator.

24. The sand trap of claim 23, wherein the choke assembly further comprises a user input to select how often the controller causes the actuator moves the valve to an open position and how long the valve remains at the open position.

25. The sand trap of claim 23, wherein the controller controls the actuator using at least one item selected from the group consisting of:
sensor data from the cylindrical vessel; and
well data.

* * * * *